(12) United States Patent
Pemble et al.

(10) Patent No.: US 10,740,416 B2
(45) Date of Patent: Aug. 11, 2020

(54) SYSTEMS AND METHODS FOR PROCESSING INFORMATION ABOUT ENTITIES BASED ON RESOURCE ANALYSIS

(71) Applicant: Facebook, Inc., Menlo Park, CA (US)

(72) Inventors: Brian James Pemble, Mountain View, CA (US); Mohan Gummalam, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 367 days.

(21) Appl. No.: 15/229,027

(22) Filed: Aug. 4, 2016

(65) Prior Publication Data
US 2018/0039701 A1 Feb. 8, 2018

(51) Int. Cl.
G06F 16/9535 (2019.01)
G06F 16/248 (2019.01)
G06F 16/957 (2019.01)
G06F 16/23 (2019.01)
G06F 16/958 (2019.01)

(52) U.S. Cl.
CPC ...... *G06F 16/9535* (2019.01); *G06F 16/2379* (2019.01); *G06F 16/248* (2019.01); *G06F 16/957* (2019.01); *G06F 16/986* (2019.01)

(58) Field of Classification Search
USPC .......................... 707/722, 706; 709/217, 226
See application file for complete search history.

(56) References Cited

U.S. PATENT DOCUMENTS

| | | | |
|---|---|---|---|
| 7,062,561 B1* | 6/2006 | Reisman | G06F 16/00 709/227 |
| 8,140,566 B2* | 3/2012 | Boerries | G06F 16/9535 707/769 |
| 9,723,053 B1* | 8/2017 | Pallemulle | H04L 67/2847 |
| 2007/0174249 A1* | 7/2007 | James | G06F 16/958 |
| 2011/0010352 A1* | 1/2011 | Jockisch | G06F 16/951 707/706 |
| 2013/0144836 A1* | 6/2013 | Adzic | G06F 16/955 707/634 |
| 2014/0075004 A1* | 3/2014 | Van Dusen | G06Q 30/0201 709/223 |
| 2014/0330594 A1* | 11/2014 | Roberts | G06Q 40/08 705/4 |
| 2015/0172307 A1* | 6/2015 | Borohovski | G06F 21/577 726/25 |
| 2015/0278868 A1* | 10/2015 | O'Connor | G06Q 30/0263 705/14.41 |
| 2015/0294377 A1* | 10/2015 | Chow | G06Q 30/0263 705/347 |
| 2016/0012074 A1* | 1/2016 | Fermum | G06F 17/30165 707/783 |

(Continued)

*Primary Examiner* — Hung T Vy
(74) *Attorney, Agent, or Firm* — Sheppard Mullin Richter & Hampton LLP

(57) ABSTRACT

Systems, methods, and non-transitory computer-readable media can analyze an online resource based on logic stored in an online resource browsing component. Data associated with an entity can be acquired, from the online resource, based on the logic stored in the online resource browsing component. A connection between the online resource browsing component and an entity database can be established. A search that utilizes the data associated with the entity can be enabled to be performed at the entity database.

16 Claims, 9 Drawing Sheets

(56) References Cited

U.S. PATENT DOCUMENTS

2016/0034305 A1* 2/2016 Shear ............... G06F 16/245
    707/722
2017/0169024 A1* 6/2017 Glover ............... G06N 20/00

* cited by examiner

SYSTEMS AND METHODS FOR PROCESSING INFORMATION ABOUT ENTITIES BASED ON RESOURCE ANALYSIS

FIELD OF THE INVENTION

The present technology relates to the field of data processing. More particularly, the present technology relates to techniques for processing information about entities based on resource analysis.

BACKGROUND

Today, people often utilize computing devices (or systems) for a wide variety of purposes. Users can use their computing devices to, for example, interact with one another, access content, share content, and create content. In some cases, users can utilize their computing devices to view, access, interact, or otherwise engage with content provided via online resources. For instance, by utilizing their computing devices, users of a social networking system or service can engage with multimedia content (i.e., media content) and/or user content provided via the social networking system. In this instance, one user (i.e., a viewing user) can view or access a profile, timeline, wall, or page of another user (i.e., a target user) in order to access information or content associated with the other user.

In some cases, there can be various online resources, such as social networking systems (or services). As such, information associated with a user or other entity can be different at different online resources. For example, an entity (e.g., a user, an organization) can have different accounts for different social networking systems. In some cases, under conventional approaches specifically arising in the realm of computer technology, entity information that is accessible or available (e.g., publicly accessible or available) via one online resource may be different or lacking at another online resource, which can cause inefficiency or inconvenience. As such, conventional approaches can create challenges for or reduce the overall experience associated with utilizing, accessing, or otherwise processing information associated with entities, such as information about users.

SUMMARY

Various embodiments of the present disclosure can include systems, methods, and non-transitory computer readable media configured to analyze an online resource based on logic stored in an online resource browsing component. Data associated with an entity can be acquired, from the online resource, based on the logic stored in the online resource browsing component. A connection between the online resource browsing component and an entity database can be established. A search that utilizes the data associated with the entity can be enabled to be performed at the entity database.

In an embodiment, one or more entity entries identified in the entity database based on the search can be presented via an interface associated with the online resource browsing component.

In an embodiment, access to information associated with the one or more entity entries can be provided via the interface associated with the online resource browsing component. The information associated with the one or more entity entries can be stored in the entity database.

In an embodiment, at least some of the information associated with the one or more entity entries can be enabled to be updated, based on the data associated with the entity acquired from the online resource, to produce updated information associated with the one or more entity entries.

In an embodiment, the updated information associated with the one or more entity entries can be identified via the interface associated with the online resource browsing component.

In an embodiment, it can be indicated, via an interface associated with the online resource browsing component, that no entity entry has been identified in the entity database based on the search. An option to generate a new entity entry in the entity database can be provided via the interface associated with the online resource browsing component. The new entity entry can be enabled to be generated in the entity database based on the data associated with the entity.

In an embodiment, the search can include comparing the data associated with the entity with at least some information associated with one or more entity entries in the entity database.

In an embodiment, the online resource can include a web page. Analyzing the online resource can include analyzing a Document Object Model (DOM) associated with the web page. The logic stored in the online resource browsing component can enable the data associated with the entity to be automatically acquired based on the DOM associated with the web page.

In an embodiment, the data associated with the entity can include text. The logic stored in the online resource browsing component can enable the data associated with the entity to be acquired based on a manual selection of the text. The online resource browsing component can correspond to a web browser extension.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
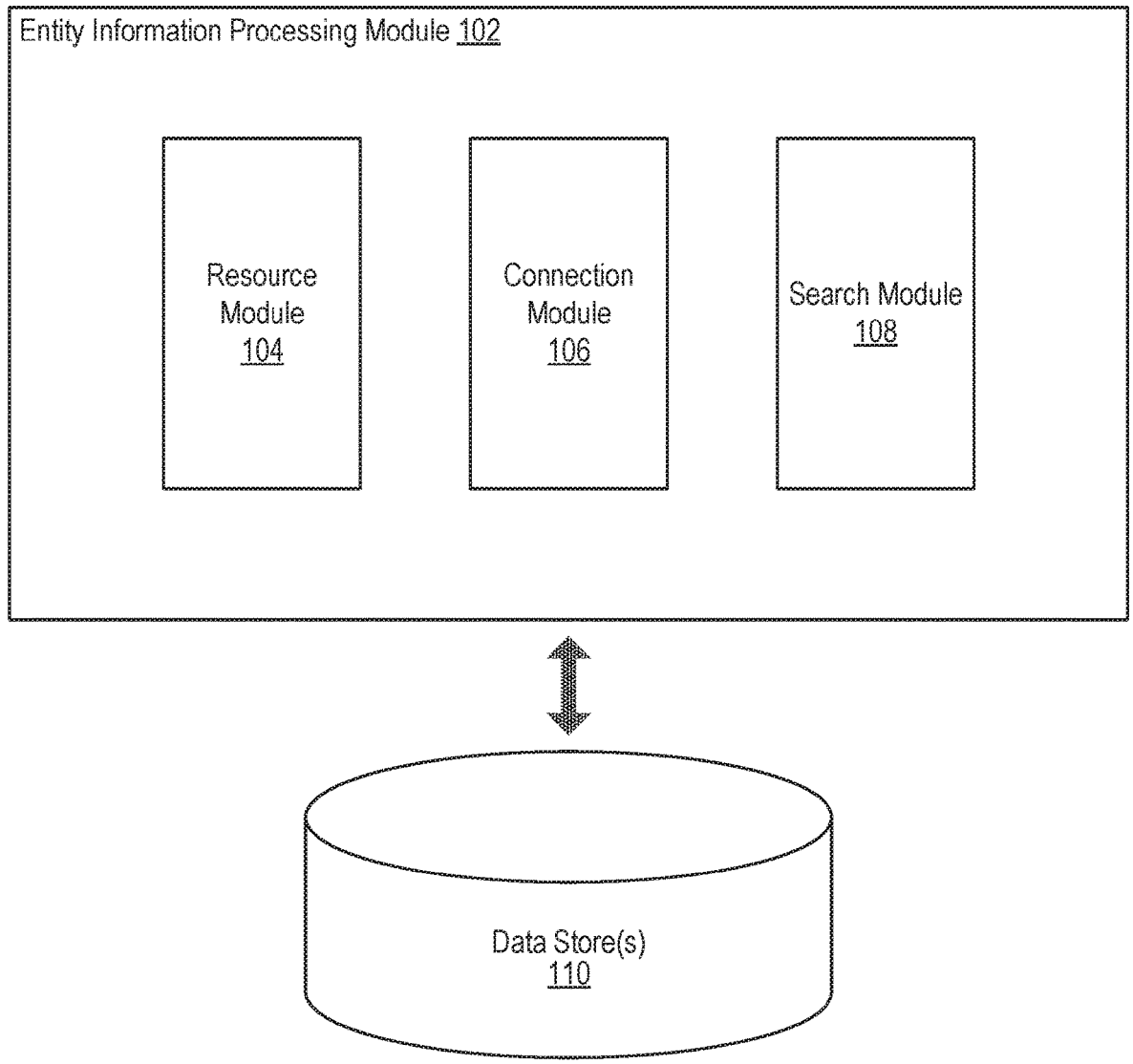
FIG. 1 illustrates an example system including an example entity information processing module configured to facilitate processing information about entities based on resource analysis, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein. It should be understood that all examples herein are provided for illustrative purposes and that there can be many variations or other possibilities associated with the disclosed technology.

DETAILED DESCRIPTION

Processing Information about Entities Based on Resource Analysis

People use computing systems (or devices) for various purposes. Users can utilize their computing systems to establish connections, engage in communications, interact with one another, and/or interact with various types of content. In some cases, computing devices can be utilized by users of an online resource, such as a social networking system (or service). In one example, users of social networking systems can use computing devices to access content provided via the social networking systems. In this example, users (i.e., viewing users) can view, access, or otherwise interact with content or other information associated with entities, such as information about other users (i.e., target users).

In some instances, users can utilize a wide variety of online resources, such as social networking systems (or services). Accordingly, different online resources can provide different information associated with a user or other entity. For example, an entity (e.g., a user, an organization, a place, etc.) can utilize different accounts for different social networking systems (e.g., professional networking systems, business-oriented social networking systems, etc.). In this example, each account for the entity can provide different content or information associated with the entity. In some cases, under conventional approaches specifically arising in the realm of computer technology, entity information that is accessible or available (e.g., publicly accessible or available) via one online resource may be different or lacking at another online resource. In one instance, a recruiter can be attempting to gather information about a potential candidate. In this instance, the recruiter can be accessing or browsing different online resources that each provide publicly accessible information about the potential candidate. However, in this instance, conventional approaches can involve the recruiter having to manually record or keep track of different pieces of information about the potential candidate, which can cause inconvenience or inefficiency.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can process information about entities based on resource analysis. Various embodiments of the present disclosure can analyze an online resource based on logic stored in an online resource browsing component. Data associated with an entity can be acquired, from the online resource, based on the logic stored in the online resource browsing component. A connection between the online resource browsing component and an entity database can be established. A search that utilizes the data associated with the entity can be enabled to be performed at the entity database. It is contemplated that there can be many variations and/or other possibilities associated with the disclosed technology.

FIG. 1 illustrates an example system 100 including an example entity information processing module 102 configured to facilitate processing information about entities based on resource analysis, according to an embodiment of the present disclosure. As shown in the example of FIG. 1, the entity information processing module 102 can include a resource module 104, a connection module 106, and a search module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the entity information processing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the entity information processing module 102 can be implemented, in part or in whole, as software running on one or more computing devices or systems, such as on a user or client computing device. For example, the entity information processing module 102 or at least a portion thereof can be implemented as or within an application (e.g., app), a program, an applet, or an operating system, etc., running on a user computing device or a client computing system, such as the user device 610 of FIG. 6. In another example, the entity information processing module 102 or at least a portion thereof can be implemented using one or more computing devices or systems which can include one or more servers, such as network servers or cloud servers. In some instances, the entity information processing module 102 can, in part or in whole, be implemented within or configured to operate in conjunction with a social networking system (or service), such as the social networking system 630 of FIG. 6. It should be appreciated that there can be many variations or other possibilities.

The resource module 104 can be configured to facilitate analyzing an online resource based on logic stored in an online resource browsing component. In some cases, the online resource can include a web site, a web page, or another web resource, such as a profile, a page, a timeline, a wall, a feed, etc., associated with a social networking system (e.g., a professional networking system, a business-oriented social networking system, a social media system, etc.). In some implementations, the online resource browsing component can correspond to a software program or application, such as a web browser extension. In some embodiments, the entity information processing module 102 can be included or implemented via the online resource browsing component.

Moreover, the resource module 104 can also be configured to facilitate acquiring, from the online resource, data associated with an entity based on the logic stored in the online resource browsing component. In some instances, the entity (i.e., a target entity) can correspond to a user, an organization, a place, etc. For example, a user (e.g., a viewing user) of the disclosed technology, such as a recruiter, can attempt to view or access data about another user (e.g., a target user), such as a potential candidate in whom the recruiter may be interested. More details regarding the resource module 104 will be provided below with reference to FIG. 2A.

In addition, the connection module 106 can be configured to facilitate establishing a connection between the online resource browsing component and an entity database. As such, the connection module 106 can enable data to be transmitted between the online resource browsing component and the entity database via the connection. For example, the connection module 106 can establish the connection between the online resource browsing component and the entity database in order to enable the online resource browsing component to subsequently make one or more Application Program Interface (API) calls to the entity database, such as for querying or searching the entity database.

In some embodiments, the entity database can be included or implemented via the at least one data store 110, which is discussed in more detail below. In some implementations, the entity database can correspond to a proprietary database. The entity database can store one or more entries respectively for one or more entities. In one example, the entity database can include a plurality of entity entries. Each entity entry can respectively store information for each of a plurality of entities, such as a plurality of potential candidates. In this example, various recruiters can collectively gather information about the potential candidates and store the information at the entity database. It should be appreciated that all examples herein are provided for illustrative purposes and that many variations associated with the disclosed technology are possible.

Furthermore, the search module 108 can be configured to facilitate enabling a search that utilizes the acquired data associated with the entity to be performed at the entity database. The search module 108 can also be configured to facilitate or perform various other tasks associated with the search. More details regarding the search module 108 will be provided below with reference to FIG. 2B.

Additionally, in some embodiments, the entity information processing module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the entity information processing module 102. Again, it is contemplated that there can be many variations or other possibilities associated with the disclosed technology.

Figure 2A:
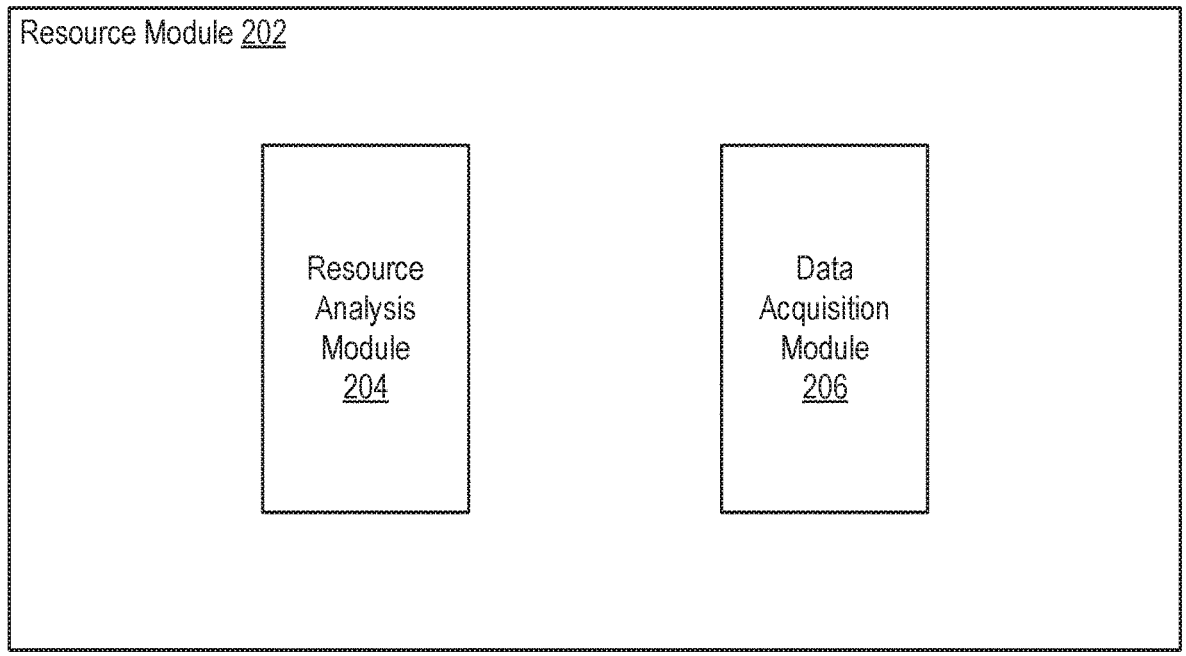
FIG. 2A illustrates an example resource module configured to facilitate processing information about entities based on resource analysis, according to an embodiment of the present disclosure.

FIG. 2A illustrates an example resource module 202 configured to facilitate processing information about entities based on resource analysis, according to an embodiment of the present disclosure. In some embodiments, the resource module 104 of FIG. 1 can be implemented as the example resource module 202. As shown in FIG. 2A, the resource module 202 can include a resource analysis module 204 and a data acquisition module 206.

As discussed previously, the resource module 202 can be configured to facilitate analyzing an online resource based on logic stored in an online resource browsing component. In some embodiments, the resource module 202 can be included or implemented via the online resource browsing component. The resource module 202 can utilize the resource analysis module 204 to analyze the online resource. For example, the logic can cause the resource analysis module 204 to access, read, parse, crawl, and/or otherwise analyze the online resource.

Moreover, the resource module 202 can be configured to facilitate acquiring, from the online resource, data associated with an entity based on the logic stored in the online resource browsing component, as discussed above. The resource module 202 can utilize the data acquisition module 206 to acquire the data associated with the entity. For instance, the logic can cause the data acquisition module 206 to receive, retrieve, recognize, store, and/or otherwise acquire the data associated with the entity during or subsequent to the analysis of the online resource.

In one example, the online resource can include a web page, such as a profile page of a social networking system user (e.g., a target user). The resource analysis module 204 can analyze the online resource based on analyzing a Document Object Model (DOM) associated with the web page. In this example, the logic can be implemented or configured such that the resource analysis module 204 is capable of recognizing which fields or portions of the DOM correspond to which types of information or data. Furthermore, the logic can be implemented or configured to enable the data acquisition module 206 to automatically acquire, based on the DOM associated with the web page, the data associated with the entity. In this example, analysis of the DOM by the resource analysis module 204 can result in the name of the entity being automatically acquired by the data acquisition module 206 from a particular DOM field or portion.

In another example, the resource analysis module 204 can analyze a web page and recognize that the web page contains text. In this example, the text on the web page can include the name of an entity (e.g., a potential candidate). In this example, another user, such as a recruiter, can be browsing or viewing the web page. The recruiter can manually select or highlight the text (e.g., the name of the potential candidate). In this example, the logic stored in the online resource browsing component can be implemented or configured to enable the data acquisition module 206 to acquire the manually selected name of the potential candidate as data associated with the entity. Accordingly, the acquired data associated with the entity can include text selected based on manual effort. In some cases, the data acquisition module 206 can acquire the manually selected text in response to a user command (e.g., an instruction from the recruiter). As discussed, it should be understood that all examples herein are illustrative and that there can be many variations or other possibilities associated with the disclosed technology.

Figure 2B:
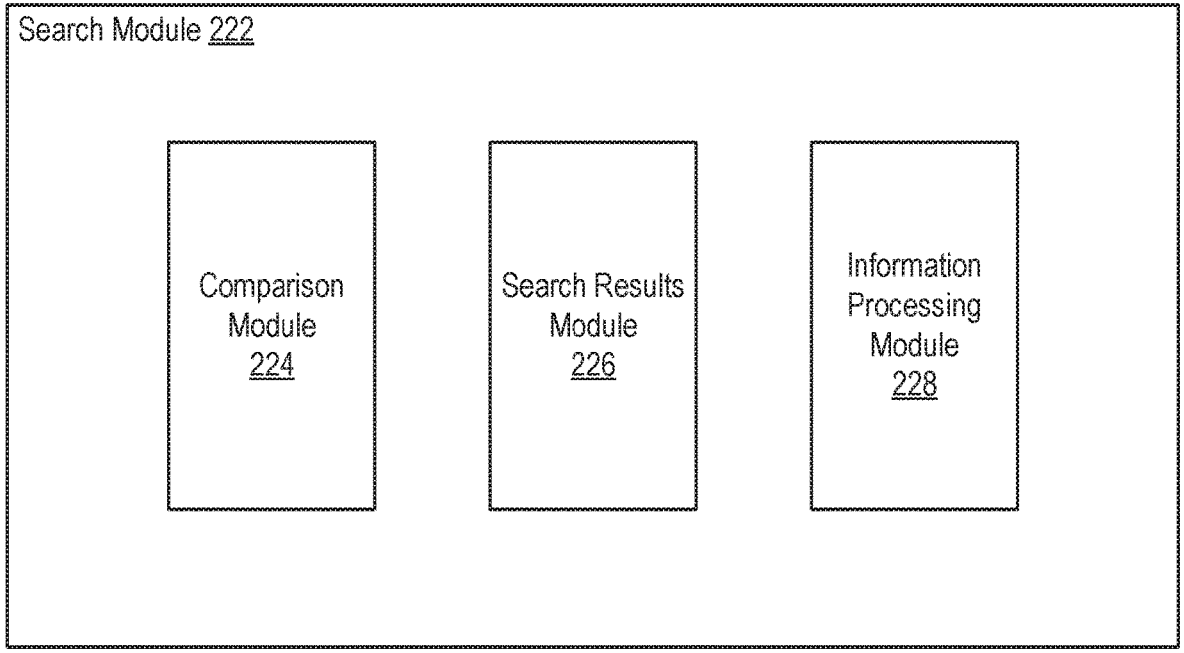
FIG. 2B illustrates an example search module configured to facilitate processing information about entities based on resource analysis, according to an embodiment of the present disclosure.

FIG. 2B illustrates an example search module 222 configured to facilitate processing information about entities based on resource analysis, according to an embodiment of the present disclosure. In some embodiments, the search module 108 of FIG. 1 can be implemented as the example search module 222. As shown in FIG. 2B, the example search module 222 can include a comparison module 224, a search results module 226, and an information processing module 228.

As discussed above, the search module 222 can be configured to facilitate enabling a search that utilizes data associated with an entity to be performed at an entity database. In some embodiments, the comparison module 224 can cause the search to include comparing the data associated with the entity with at least some information associated with one or more entity entries in the entity database. For example, acquired data associated with the entity can include an identifier (e.g., a name) of the entity. As such, in this example, the search module 222 can enable a search for an entity entry to be performed at the entity database using the acquired identifier, which can be provided by the comparison module 224 to the entity database. The identifier can then be compared to identification information associated with the entity entries. In some cases, the comparison module 224 can provide other and/or additional data associated with the entity for comparison with information associated with entity entries in the entity database.

Additionally, the search module 222 can also be configured to facilitate or perform various other tasks associated with the search. In some implementations, the search module 222 can utilize the search results module 226 to perform various operations or tasks associated with results produced from the search. In one example, the search results module 226 can present, via an interface associated with the online resource browsing component (e.g., a web browser frame or interface portion enabled by a web browser extension), one or more entity entries identified in the entity database based on the search. In some instances, the one or more identified entity entries can include a single, particular entity entry. In some cases, when the one or more identified entity entries include multiple entries, a viewing user can select a particular entity entry in order to access more details about the particular entity entry. Information associated with the particular entity entry can be stored in the entity database. Continuing with the example, the search results module 226 can provide, via the interface associated with the online resource browsing component, access to the information associated with the particular entity entry (or a copy/instance of the information). As such, a recruiter utilizing the disclosed technology can, for instance, view or access information about a particular potential candidate(s).

Moreover, in some embodiments, the information processing module 228 can enable at least some of the information associated with the one or more identified entity entries to be updated, based on the data associated with the entity acquired from the online resource, to produce updated information associated with the one or more entity entries. For instance, it can be determined that there is new data associated with the entity that is not stored, maintained, or kept up to date in a respective entity entry of the entity database. Accordingly, in this instance, the information processing module 228 can update at least some of the information associated with the respective entity entry identified for the entity. In some cases, the information processing module 228 can also highlight, mark, and/or otherwise identify, via the interface associated with the online resource browsing component, the updated information.

Furthermore, in another example, the search results module 226 can indicate, via an interface associated with the online resource browsing component, that no entity entry has been identified in the entity database based on the search. In this example, the search results module 226 can provide, via the interface associated with the online resource browsing component, an option to generate a new entity entry in the entity database. The information processing module 228 can enable the new entity entry to be generated in the entity database, such as by providing the data associated with the entity. Accordingly, the new entity entry can be generated in the entity database based on the data associated with the entity. Again, it should be understood that all examples herein are illustrative and that many variations are possible.

Figure 3:
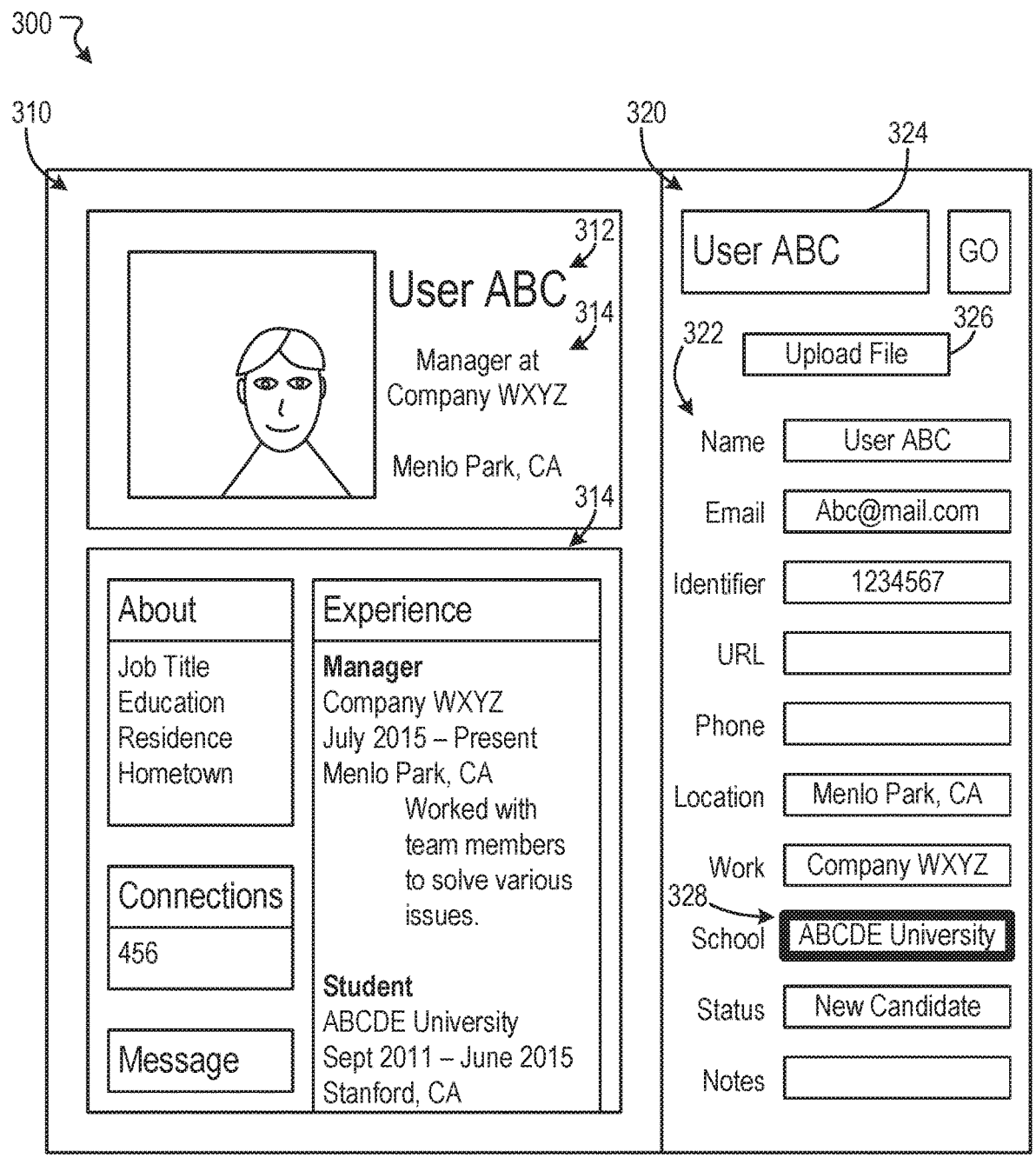
FIG. 3 illustrates an example scenario associated with processing information about entities based on resource analysis, according to an embodiment of the present disclosure.

FIG. 3 illustrates an example scenario 300 associated with processing information about entities based on resource analysis, according to an embodiment of the present disclosure. As shown in the example scenario 300, there can be a web browser that includes a primary interface 310 for viewing one or more online resources, such as web pages. The disclosed technology can enable the web browser to be associated with an online resource browsing component, such as a web browser extension. The disclosed technology can also implement, configure, and/or provide logic stored in the web browser extension. For instance, the logic can cause the web browser to present another interface 320 for providing information about entities (e.g., information associated with entity entries in an entity database). The logic can also cause one or more connections to be established between the web browser (or the web browser extension) and the entity database.

In one example, a viewing user (e.g., a recruiter) can utilize the web browser to access information about a target user (e.g., a potential candidate). In this example, the viewing user can use the web browser to visit a profile page of a particular target user (User ABC) 312 such that the primary web browser interface 310 presents to the viewing user various types of data 314 associated with the particular target user 312. Moreover, the disclosed technology can analyze the profile page of the target user 312. In this example, based on the analysis of the profile page, at least the name of the target user 312 can be automatically acquired from the profile page to enable a search to be performed at the entity database based on the acquired name of the target user 312. Subsequently, an entity entry that matches (within an allowable deviation) the name of the target user 312 can be identified based on the search at the entity database. As shown in the example scenario 300, various types of information 322 associated with the entity entry (e.g., additional details/information about the target user 312) can be provided to the viewing user via the web browser extension interface 320. The information 322 can also be modified, deleted, and/or otherwise updated for the entity entry (which has been identified for the target user 312).

In some embodiments, the web browser extension interface 320 can also provide a search box 324 which enables searches to be performed at the entity database using automatically acquired search terms (e.g., the name of the target user 312) or manually inputted search terms. The disclosed technology can also enable the viewing user to upload files (e.g., pictures, videos, audio, documents, resumes, etc.) 326 to be stored for the target user 312 at the entity database. Furthermore, in this example scenario 300, the disclosed technology can determine, based on analysis of the profile page, that a "School" field of the entity entry is outdated (e.g., empty, incorrect, etc.). In this example, the disclosed technology can acquire school/education data about the target user 312 from the profile page and can update the "School" field of the entity entry. Moreover, in some cases, the disclosed technology can highlight, mark, indicate, and/ or otherwise identify 328, via the web browser extension interface 320, the updated information (e.g., the updated "School" field is highlighted 328). Again, many variations associated with the disclosed technology are possible.

Figure 4:
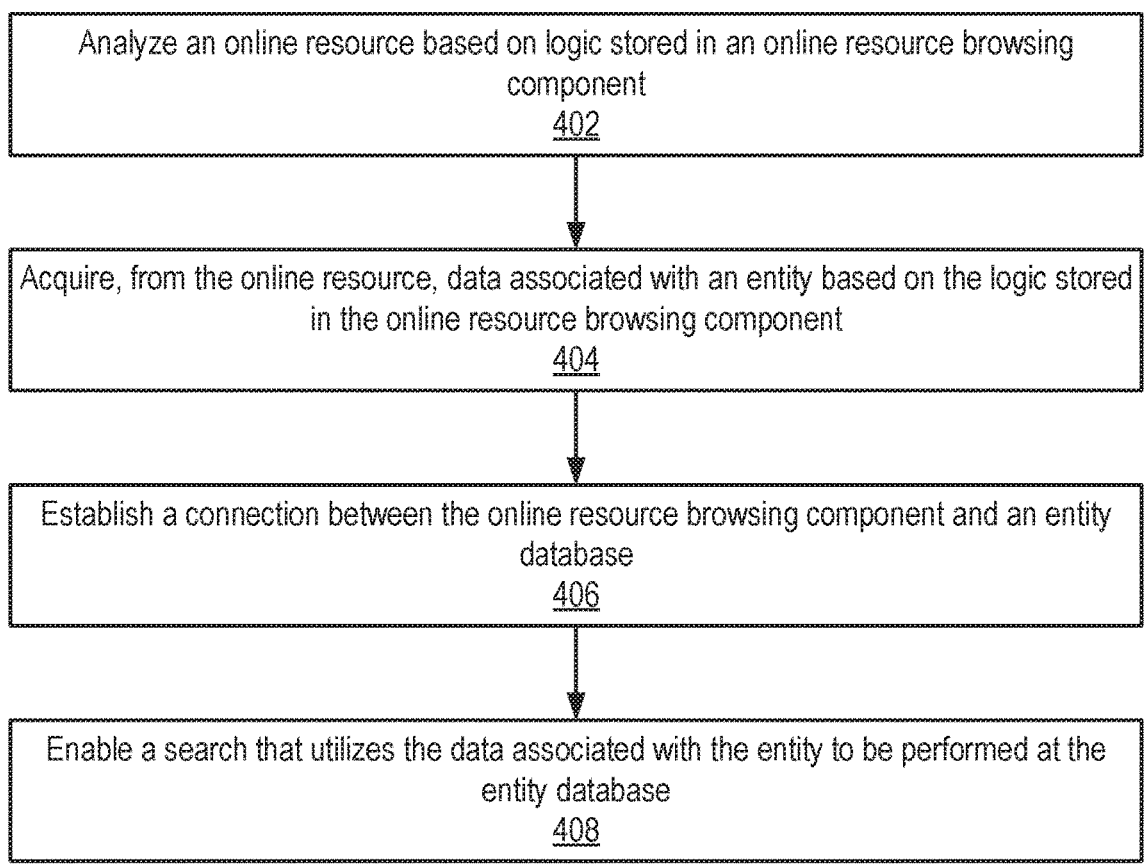
FIG. 4 illustrates an example method associated with processing information about entities based on resource analysis, according to an embodiment of the present disclosure.

FIG. 4 illustrates an example method 400 associated with processing information about entities based on resource analysis, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can analyze an online resource based on logic stored in an online resource browsing component. At block 404, the example method 400 can acquire, from the online resource, data associated with an entity based on the logic stored in the online resource browsing component. At block 406, the example method 400 can establish a connection between the online resource browsing component and an entity database. At block 408, the example method 400 can enable a search that utilizes the data associated with the entity to be performed at the entity database.

Figure 5A:
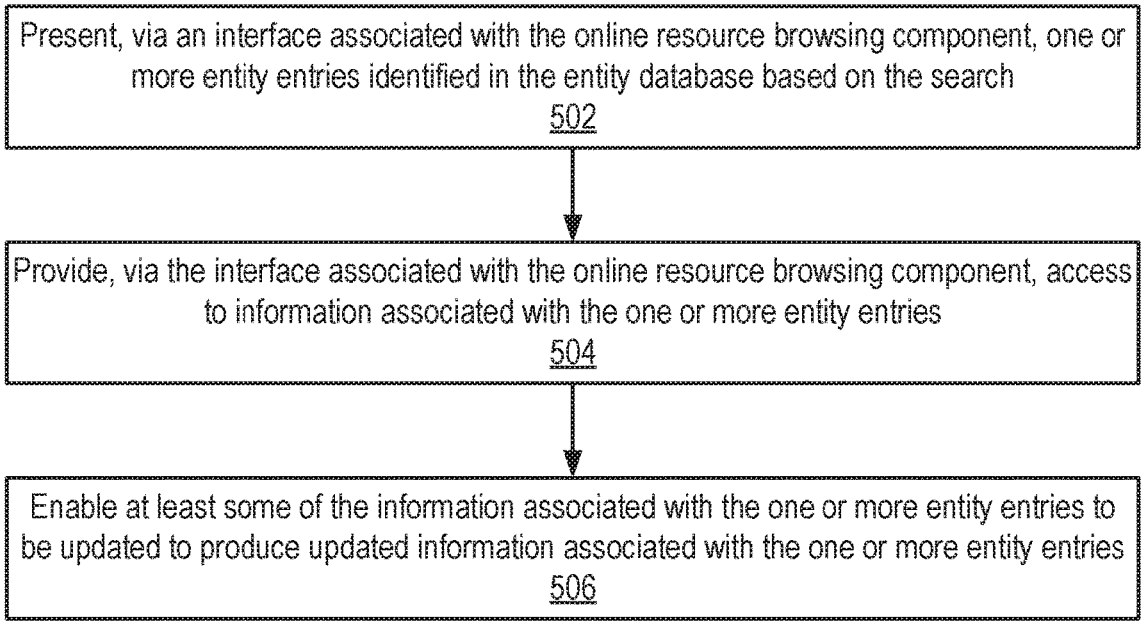
FIG. 5A illustrates an example method associated with processing information about entities based on resource analysis, according to an embodiment of the present disclosure.

FIG. 5A illustrates an example method 500 associated with processing information about entities based on resource analysis, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can present, via an interface associated with the online resource browsing component, one or more entity entries identified in the entity database based on the search. At block 504, the example method 500 can provide, via the interface associated with the online resource browsing component, access to information associated with the one or more entity entries. The information associated with the one or more entity entries can be stored in the entity database. At block 506, the example method 500 can enable at least some of the information associated with the one or more entity entries to be updated, based on the data associated with the entity acquired from the online resource, to produce updated information associated with the one or more entity entries.

Figure 5B:
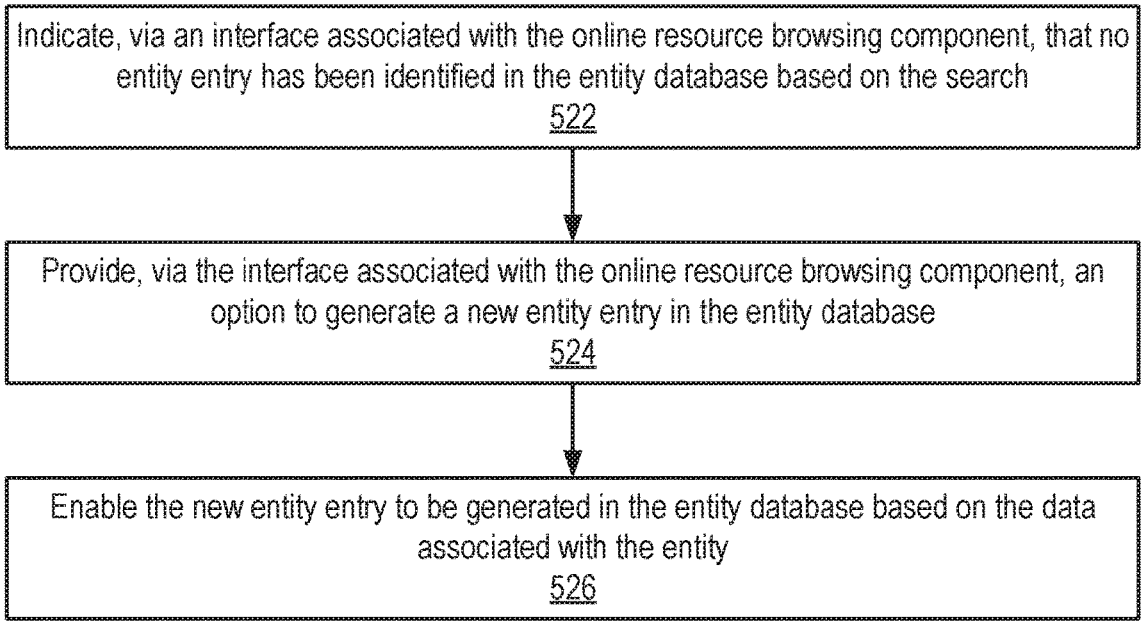
FIG. 5B illustrates an example method associated with processing information about entities based on resource analysis, according to an embodiment of the present disclosure.

FIG. 5B illustrates an example method 520 associated with processing information about entities based on resource analysis, according to an embodiment of the present disclosure. Again, it is contemplated that there can be additional, fewer, or alternative steps performed in similar or alternative orders, or in parallel, within the scope of the various embodiments unless otherwise stated.

At block 522, the example method 520 can indicate, via an interface associated with the online resource browsing component, that no entity entry has been identified in the entity database based on the search. At block 524, the example method 520 can provide, via the interface associated with the online resource browsing component, an option to generate a new entity entry in the entity database. At block 526, the example method 520 can enable the new entity entry to be generated in the entity database based on the data associated with the entity.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
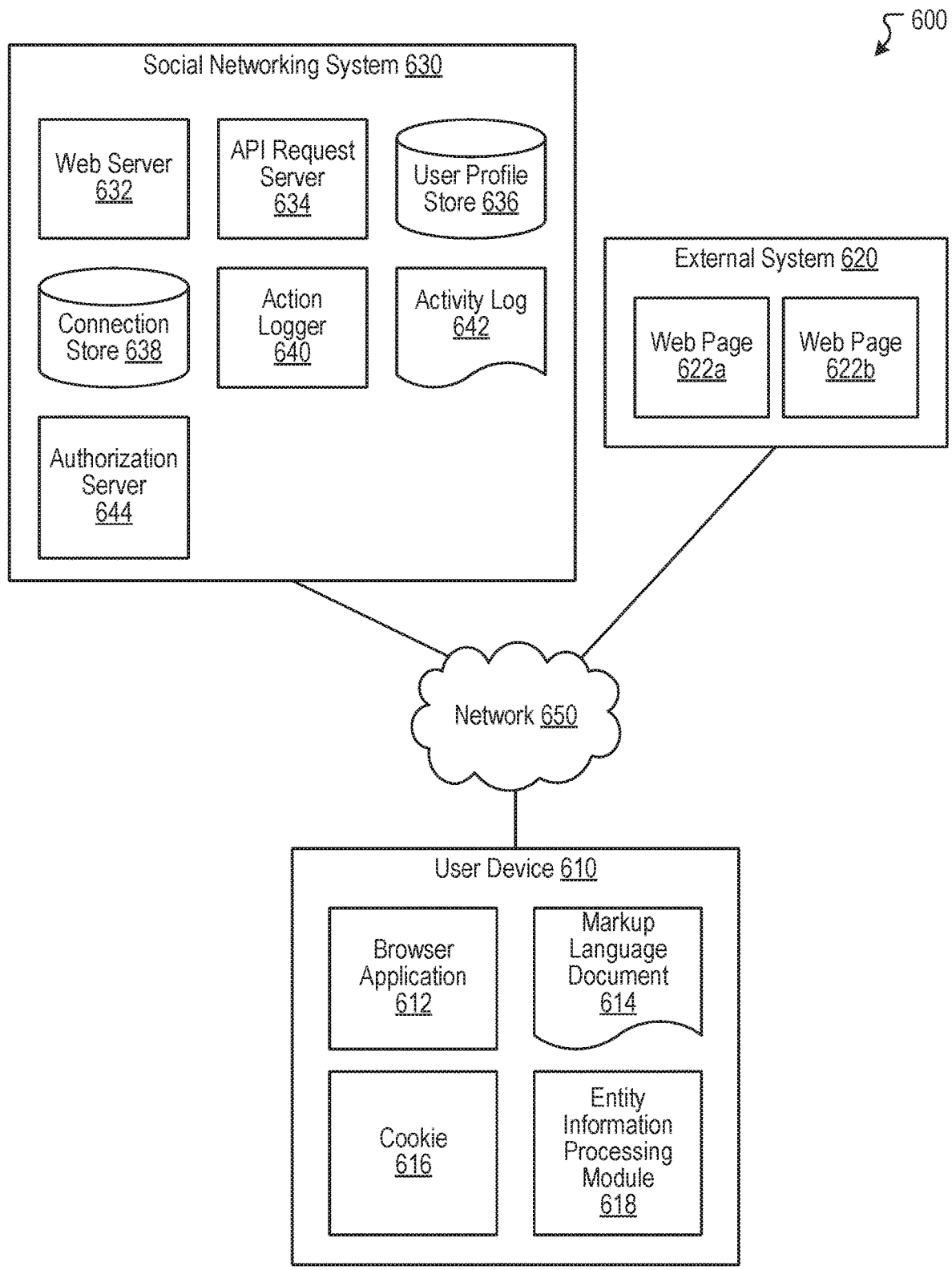
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems

620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include an entity information processing module 618. The entity information processing module 618 can, for example, be implemented as the entity information processing module 102 of FIG. 1. As discussed previously, it should be appreciated that there can be many variations or other possibilities associated with the disclosed technology. For example, in some instances, the entity information processing module (or at least a portion thereof) can be included or implemented in the social networking system 630. Other features of the entity information processing module 618 are discussed herein in connection with the entity information processing module 102.

Hardware Implementation

Figure 7:
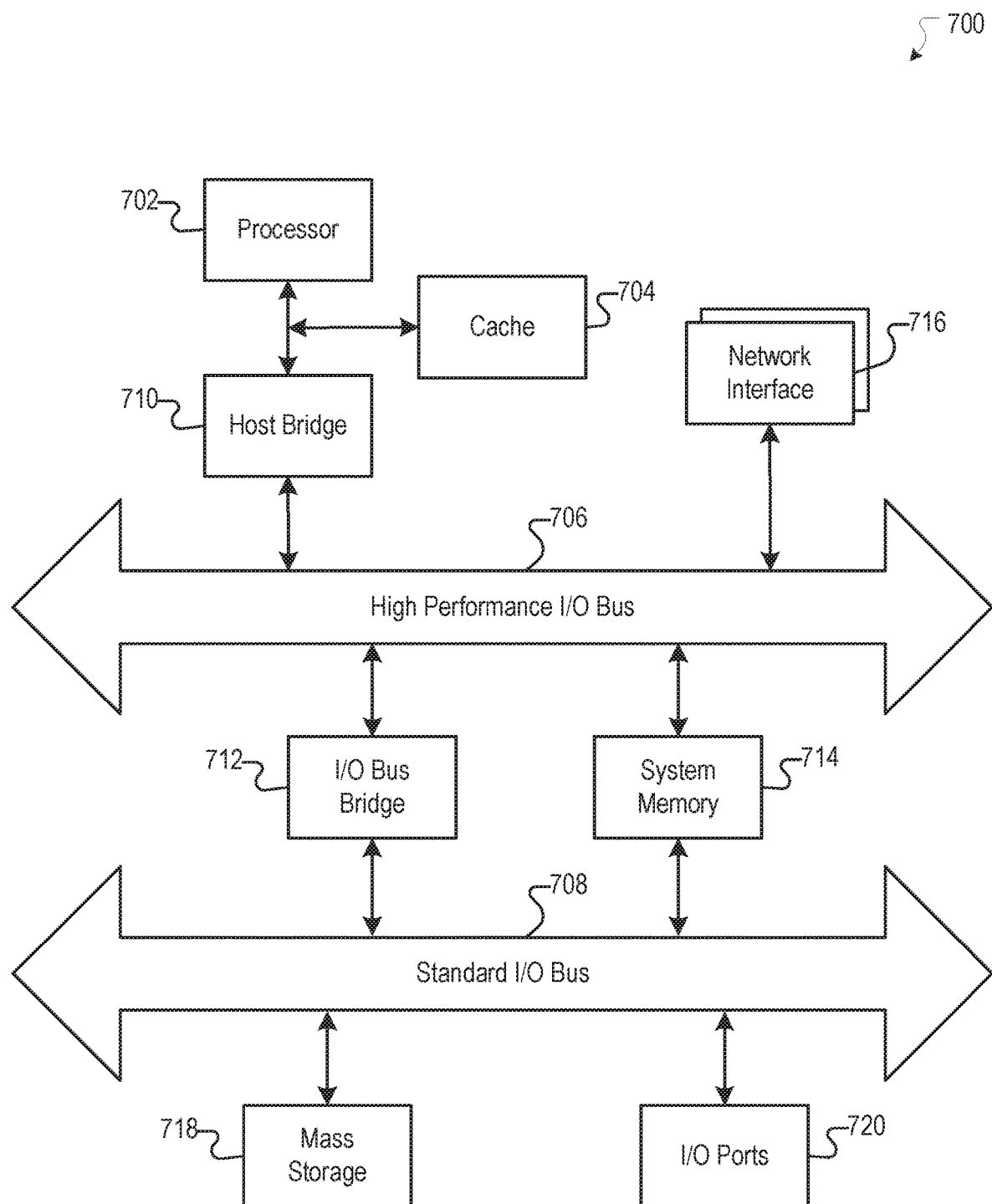
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
analyzing, by a computing system, an online resource based on logic stored in an online resource browsing component, wherein the online resource browsing component corresponds to a web browser extension;
acquiring, by the computing system, from the online resource, data associated with an entity based on the logic stored in the online resource browsing component;
establishing, by the computing system, a connection between the online resource browsing component and an entity database; and
based on the online resource browsing component, enabling, by the computing system, a search that utilizes the data associated with the entity to be performed at the entity database, the enabling further comprising:
determining, by the computing system, information associated with at least one entity entry in the entity database is incorrect based at least in part on the data associated with the entity acquired from the online resource, wherein the incorrect information includes at least one profile setting associated with the entity; and
updating, by the computing system, at least some of the incorrect information associated with the at least one entity entry in the entity database based at least in part on the data associated with the entity acquired from the online resource; and
instructing, by the computing system, the online resource browsing component to visually identify within the online resource that the at least one profile setting associated with the entity has been updated in the entity database.

2. The computer-implemented method of claim 1, further comprising:
presenting, via an interface associated with the online resource browsing component, one or more entity entries identified in the entity database based on the search.

3. The computer-implemented method of claim 2, further comprising:

providing, via the interface associated with the online resource browsing component, access to information associated with the one or more entity entries, the information associated with the one or more entity entries being stored in the entity database.

4. The computer-implemented method of claim 1, further comprising:
identifying, via the interface associated with the online resource browsing component, the updated information associated with the one or more entity entries.

5. The computer-implemented method of claim 1, further comprising:
indicating, via an interface associated with the online resource browsing component, that no entity entry has been identified in the entity database based on the search;
providing, via the interface associated with the online resource browsing component, an option to generate a new entity entry in the entity database; and
enabling the new entity entry to be generated in the entity database based on the data associated with the entity.

6. The computer-implemented method of claim 1, wherein the search includes comparing the data associated with the entity with at least some information associated with one or more entity entries in the entity database.

7. The computer-implemented method of claim 1, wherein the online resource includes a web page, wherein analyzing the online resource includes analyzing a Document Object Model (DOM) associated with the web page, and wherein the logic stored in the online resource browsing component enables the data associated with the entity to be automatically acquired based on the DOM associated with the web page.

8. The computer-implemented method of claim 1, wherein the data associated with the entity includes text, and wherein the logic stored in the online resource browsing component enables the data associated with the entity to be acquired based on a manual selection of the text.

9. A system comprising:
at least one processor; and
a memory storing instructions that, when executed by the at least one processor, cause the system to perform:
analyzing an online resource based on logic stored in an online resource browsing component, wherein the online resource browsing component corresponds to a web browser extension;
acquiring from the online resource, data associated with an entity based on the logic stored in the online resource browsing component;
establishing a connection between the online resource browsing component and an entity database; and
based on the online resource browsing component, enabling a search that utilizes the data associated with the entity to be performed at the entity database, the enabling further comprising:
determining information associated with at least one entity entry in the entity database is incorrect based at least in part on the data associated with the entity acquired from the online resource, wherein the incorrect information includes at least one profile setting associated with the entity; and
updating at least some of the incorrect information associated with the at least one entity entry in the entity database based at least in part on the data associated with the entity acquired from the online resource; and
instructing the online resource browsing component to visually identify within the online resource that the at least one profile setting associated with the entity has been updated in the entity database.

10. The system of claim 9, wherein the instructions cause the system to further perform:
presenting, via an interface associated with the online resource browsing component, one or more entity entries identified in the entity database based on the search.

11. The system of claim 10, wherein the instructions cause the system to further perform:
providing, via the interface associated with the online resource browsing component, access to information associated with the one or more entity entries, the information associated with the one or more entity entries being stored in the entity database.

12. The system of claim 9, wherein the instructions cause the system to further perform:
indicating, via an interface associated with the online resource browsing component, that no entity entry has been identified in the entity database based on the search;
providing, via the interface associated with the online resource browsing component, an option to generate a new entity entry in the entity database; and
enabling the new entity entry to be generated in the entity database based on the data associated with the entity.

13. A non-transitory computer-readable storage medium including instructions that, when executed by at least one processor of a computing system, cause the computing system to perform a method comprising:
analyzing an online resource based on logic stored in an online resource browsing component, wherein the online resource browsing component corresponds to a web browser extension;
acquiring from the online resource, data associated with an entity based on the logic stored in the online resource browsing component;
establishing a connection between the online resource browsing component and an entity database; and
based on the online resource browsing component, enabling a search that utilizes the data associated with the entity to be performed at the entity database, the enabling further comprising:
determining information associated with at least one entity entry in the entity database is incorrect based at least in part on the data associated with the entity acquired from the online resource, wherein the incorrect information includes at least one profile setting associated with the entity; and
updating at least some of the incorrect information associated with the at least one entity entry in the entity database based at least in part on the data associated with the entity acquired from the online resource; and
instructing the online resource browsing component to visually identify within the online resource that the at least one profile setting associated with the entity has been updated in the entity database.

14. The non-transitory computer-readable storage medium of claim 13, wherein the instructions cause the computing system to further perform:
presenting, via an interface associated with the online resource browsing component, one or more entity entries identified in the entity database based on the search.

15. The non-transitory computer-readable storage medium of claim 14, wherein the instructions cause the computing system to further perform:
- providing, via the interface associated with the online resource browsing component, access to information associated with the one or more entity entries, the information associated with the one or more entity entries being stored in the entity database.

16. The non-transitory computer-readable storage medium of claim 13, wherein the instructions cause the computing system to further perform:
- indicating, via an interface associated with the online resource browsing component, that no entity entry has been identified in the entity database based on the search;
- providing, via the interface associated with the online resource browsing component, an option to generate a new entity entry in the entity database; and enabling the new entity entry to be generated in the entity database based on the data associated with the entity.

* * * * *